(12) United States Patent
Ijima

(10) Patent No.: US 7,569,964 B2
(45) Date of Patent: Aug. 4, 2009

(54) VARIABLE RELUCTANCE TYPE ANGLE DETECTOR

(76) Inventor: Yasuo Ijima, 3-34-8, Shinsenriminami-machi, Toyonaka-shi (JP) 565-0084

( * ) Notice: Subject to any disclaimer, the term of this patent is extended or adjusted under 35 U.S.C. 154(b) by 405 days.

(21) Appl. No.: 11/545,637

(22) Filed: Oct. 10, 2006

(65) Prior Publication Data
US 2007/0085531 A1    Apr. 19, 2007

(30) Foreign Application Priority Data
Oct. 14, 2005   (JP) .............................. 2005-299773

(51) Int. Cl.
*H02K 19/20* (2006.01)
*G01B 7/30* (2006.01)
*H02K 3/46* (2006.01)

(52) U.S. Cl. .................. 310/194; 310/71; 310/168; 324/207.25

(58) Field of Classification Search ............ 324/207.25, 324/207.17; 310/71, 68 B, 168, 194
See application file for complete search history.

(56) References Cited

U.S. PATENT DOCUMENTS

| | | | | |
|---|---|---|---|---|
| 3,281,655 A | * | 10/1966 | Blasingame | ................ 323/348 |
| 3,705,343 A | * | 12/1972 | Ringland et al. | ............ 323/348 |
| 4,631,510 A | * | 12/1986 | Nagarkatti et al. | .......... 336/135 |
| 5,717,273 A | * | 2/1998 | Gulbrandson et al. | ....... 310/260 |
| 5,757,182 A | | 5/1998 | Kitazawa | |
| 5,920,135 A | * | 7/1999 | Ohshita | ....................... 310/71 |
| 7,009,385 B2 | * | 3/2006 | Kobayashi et al. | ..... 324/207.12 |
| 7,298,138 B2 | * | 11/2007 | Mimura | ................. 324/207.25 |
| 2003/0011271 A1 | * | 1/2003 | Takano et al. | ............... 310/254 |
| 2005/0040816 A1 | * | 2/2005 | Ando et al. | ............ 324/207.25 |
| 2006/0091757 A1 | * | 5/2006 | Aoki et al. | ................... 310/215 |
| 2009/0102310 A1 | * | 4/2009 | Amano | ....................... 310/215 |

FOREIGN PATENT DOCUMENTS

JP          08-178611          7/1996

* cited by examiner

*Primary Examiner*—Burton Mullins
(74) *Attorney, Agent, or Firm*—Jordan and Hamburg LLP

(57) ABSTRACT

The variable reluctance type angle detector has a stator and a rotor. The rotor is provided rotatably with respect to the stator. The stator has a plurality of tooth members disposed in a circle. An excitation wire and an output wire are wound around the tooth members. The rotor has such a shape that a gap permeance with respect to the stator varies in a sine wave fashion with respect to an angle θ. The stator is provided with an end insulator for insulating and covering the tooth members. The end insulator is provided with partitions each insulating and separating the excitation wire from the output wire wound around each of the tooth members in a radial direction of the stator.

7 Claims, 8 Drawing Sheets

VARIABLE RELUCTANCE TYPE ANGLE DETECTOR

CROSS REFERENCE TO RELATED APPLICATION

This application claims priority from Japanese Patent Application No. 2005-299773 filed Oct. 14, 2005. The entire content of this priority application is incorporated herein by reference.

BACKGROUND OF THE INVENTION

1. Field of the Invention

This invention relates to a variable reluctance type angle detector comprising a rotor having such a shape that a gap permeance varies in a sine wave fashion with respect to an angle θ, the rotor being rotatable with respect to a stator in which an excitation wire and an output wire are wound around tooth members.

2. Description of the Related Art

As a conventional variable reluctance type angle detector, the one having a rotor provided rotatably inside a stator is known. The stator has a stator core provided with twelve tooth members, for example, projecting inward and disposed in a circle. An excitation wire and a two-phase output wire are wound around each of the tooth members of the stator core.

The excitation wire is wound around each of the tooth members in such a manner that a polarity is alternated successively along a circumferential direction. The excitation wire wound around each of the tooth members forms an excitation coil. The two-phase output wire is wound around the tooth members so as to obtain a SIN output and a COS output that are different in phase from each other by 90°. The two-phase output wire wound around each of the tooth members forms an output coil. The rotor has such an outer shape that a gap permeance between the rotor and the stator varies in a sine wave fashion with respect to an angle θ. When the rotor rotates, an excitation voltage supplied to the excitation wire is outputted from one of the output wires as a COS output voltage while being outputted from the other output wire as a SIN output voltage. Such variable reluctance type angle detector is disclosed in JP-A-H8-178611, for example.

Shown in FIGS. 5 and 6 is one example of the conventional winding structure. In the winding structure, an excitation wire 93 and an output wire 94 are wound around twelve tooth members 91 in the form of two layers. A stator core constituting each of the tooth members 91 is provided with an end insulator 92. The end insulator 92 provides an insulating coating on the tooth members 91. The excitation wire 93 is wound around the twelve tooth members 91 positively and negatively.

As the output wire 94, the one outputting a COS output voltage and the one outputting a SIN output voltage are used. The output wires 94 are wound around predetermined tooth members 91 to achieve a COS output and a SIN output depending on the number of the positive windings and the number of negative windings. Either one of the COS outputting or SIN outputting output wires 94 is wound around each of the predetermined tooth members 91. The type of the output wire 94 and the number of the positive windings or negative windings on the tooth member 91 are appropriately set, and these settings are omitted in FIG. 5. The excitation wire 93 is wound around each of the tooth members 91. The output wire 94 is wound from the outside of the excitation wire 93.

As shown in FIG. 6, the excitation wire 93 and the output wire 94 are wound around the tooth members 91 from outside the end insulator 92 as two layers. Though not shown in FIG. 6, each of the excitation wire 93 and the output wire 94 is coated with an enamel layer. The enamel layer prevents electrical short which is otherwise caused between the excitation wire 93 and the output wire 94.

As shown in FIGS. 7 and 8, projections 96 are provided on an outer periphery of the end insulator 92. Winding start portions and winding end portions of the excitation wire 93 and the output wire 94 wound around the tooth members 91 are tied to the projections 96. Crossovers of the excitation wire 93 or the output wire 94 for gaps between the adjacent tooth members 91 are also tied to the projections 96. In the winding start portions, the winding end portions, and the crossovers, the excitation wire 93 and the output wires 94 are brought into contact with each other and the excitation wire 93 is brought into contact with itself or the output wire 94 is brought into contact with itself.

In the above-described conventional variable reluctance type angle detector, insulation for the contact portions between the excitation wire 93 and the output wire 94, the contact portions of the excitation wire 93, and the contact portions of the output wires 94 are ensured by the enamel layers which are skin portions of the excitation wire 93 and the output wires 94. In general, along with an increase in contact portion between wires, a probability for occurrence of insufficient insulation is increased. As one of the causes for the insufficient insulation, stripping of the enamel layer is considered. Also, the enamel layer can be stripped off with time by vibration or the like during use. The incipient failure due to the insufficient insulation reduces a yield of product. The insufficient insulation with time deteriorates reliability of the product.

SUMMARY OF THE INVENTION

This invention was accomplished in view of the above-described background. An object of this invention is to provide a variable reluctance type angle detector with high insulation reliability.

Other objects and effects of this invention will become apparent from the following detailed description.

A variable reluctance type angle detector according to this invention comprises a rotor having such a shape that a gap permeance varies in a sine wave fashion with respect to an angle θ, the rotor being rotatable with respect to a stator in which an excitation wire and an output wire are wound around a plurality of tooth members disposed in a circle. The stator is provided with an end insulator for insulating and covering the tooth members. The end insulator is provided with a partition for insulating and separating the excitation wire from the output wire wound around the tooth members in a radial direction of the stator.

The excitation wire and the output wire are wound around the tooth members of the stator from outside the end insulator. In each of the tooth members, the partition insulates and separates a part for winding thereon the excitation wire from a part for winding thereon the output wire in the radial direction of the stator. The excitation wire and the output wire are wound around the parts insulated and separated by the partition. With such constitution, the excitation wire and the output wire are reliably insulated from each other. Therefore, reliability of insulation of the variable reluctance type angle detector is enhanced.

DESCRIPTION OF THE PREFERRED EMBODIMENTS

Hereinafter, this invention will be described in detail with reference to the drawings and based on preferred embodiments.

Figure 1:
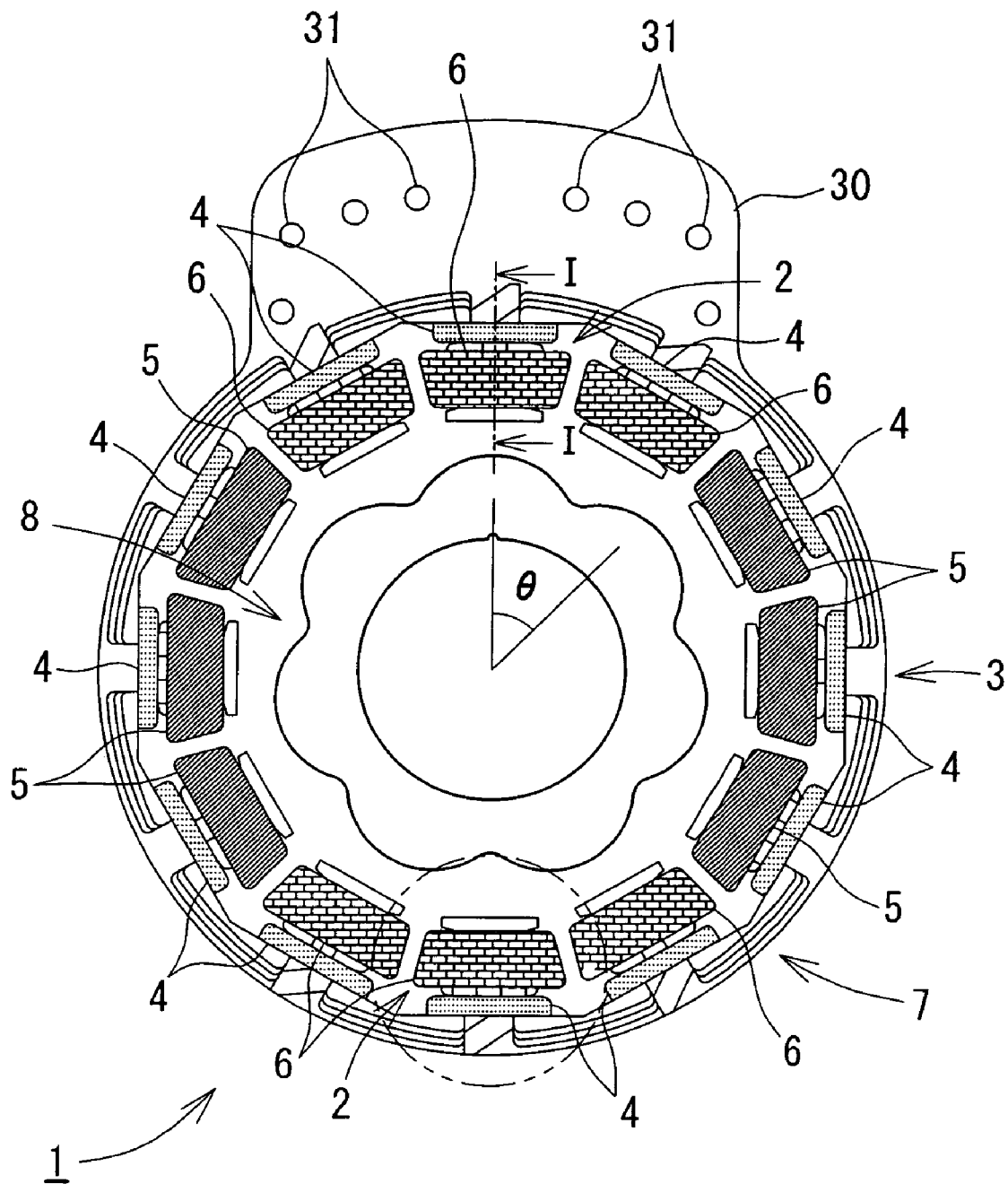
FIG. 1 is a plan view showing a main structure of a variable reluctance type angle detector 1 according to one embodiment of this invention.

Shown in FIG. 1 is a main structure of a variable reluctance type angle detector 1 according to one embodiment of this invention. As shown in FIG. 1, the variable reluctance type angle detector 1 is provided with a stator 7 and a rotor 8 disposed rotatably at the center of the stator 7. The stator 7 has twelve tooth members 2 disposed in a circle and projected inward. Insulating coating by an end insulator 3 is provided on the tooth members 2. An excitation wire 4 and output wires 5 and 6 are wound from the outside of the end insulator 3.

As shown in FIG. 1, an overall outer shape of the stator 7 is substantially in the form of a ring. The twelve tooth members 2 project radially inward from an inner periphery of the stator 7. The stator 7 has a stator core and the end insulator 3. The stator core is formed by pressing a steel plate having a predetermined thickness into the shape shown in FIG. 1 and then integrally fixing a stack of a plurality of such steel plates by caulking or the like. Since the stator core is covered with the end insulator 3, the stator core is not shown in FIG. 1. The end insulator 3 provides insulating coating on the twelve tooth members 2 of the stator core. The excitation wire 4 and the output wires 5 or 6 are wound from the outside of the end insulator 3. Thus, a coil is formed on each of the tooth members 2.

As shown in FIG. 1, an overall outer shape of the rotor 8 is substantially in the form of a ring. An outer periphery of the rotor 8 has such a shape that a gap permeance between the rotor 8 and the stator 7 varies in the form of a positive sine wave with respect to an angle θ in a direction of rotation of the rotor 8. Like the stator core, the rotor 8 is formed by pressing a steel plate having a predetermined thickness into the shape shown in FIG. 1 and then integrally fixing a stack of a plurality of such steel plates by caulking or the like. Though the rotor 8 of this embodiment is of a so-called axial double angle of 7X type having projections at seven points on an outer periphery, the axial double angle of the rotor of this invention is not particularly limited, and it is possible to arbitrarily select any one of 1X, 2X, 3X, 4X, and the like.

The end insulator 3 is formed of a pair of members sandwiching the stator core from axial directions. Only one of the members is shown in FIG. 1, and the other member has the substantially same shape. The end insulator 3 has the shape which is substantially the same as the stator core as viewed in the plan view. The end insulator 3 is obtainable by molding a synthetic resin having insulating property, for example. The end insulator 3 provides the insulating coating on the twelve tooth members 2 of the stator core as well as yoke portions between the adjacent tooth members 2. A projection 30 is formed on the end insulator 3. The projection 30 projects in a radially outward direction of the stator 7. Generally, the projection 30 is provided with terminals 31 which are used for maintaining electrical connection with the excitation wire 4 and the output wires 5 and 6.

Figure 2:
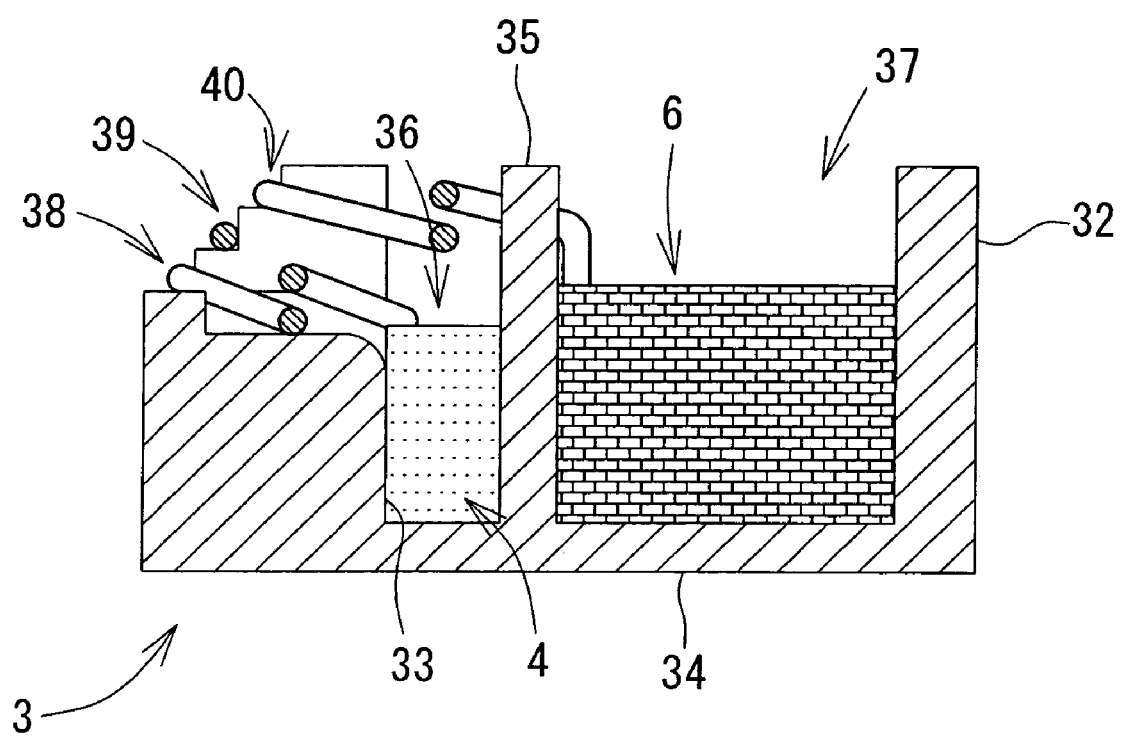
FIG. 2 is a sectional view showing the I-I section of FIG. 1.

FIG. 2 is a sectional view taken along the line I-I FIG. 1 and shows a section structure of the end insulator 3 in each of tooth members 2. In FIG. 2, the right hand side is a radially inward part of the stator 7 (hereinafter simply referred to as radially inward part) and the left hand side is a radially outward part of the stator 7 (hereinafter simply referred to as radially outward part). As shown in FIG. 2, the end insulator 3 has an inner support 32, an outer support 33, and a peripheral coating 34. The inner support 32 supports the coil in the radially inward part of the tooth member 2. The outer support 33 supports the coil in the radially outward part of the tooth member 2. The peripheral coating 34 covers a peripheral surface (end face) of the tooth member 2 between the inner support 32 and the outer support 33. The inner support 32 and the outer support 33 are disposed apart from each other in a radial direction of the stator 7 and projected from the peripheral coating 34 in an axial direction (vertical direction in FIG. 2) of the stator 7.

A partition 35 is provided between the inner support t32 and the outer support 33. The partition 35 is projected from the peripheral coating 34 in the axial direction of the stator 7. The partition 35 separates the inner support 32 from the outer support 33 to form a space 36 in the radially outward part and a space 37 in the radially inward part. The partition 35 is formed integrally with the end insulator 3 and has insulating property. Therefore, the spaces 36 and 37 are electrically insulated from each other by the partition 35. The partition 35 is disposed in the radially outward part from the center with respect to the radial direction of the stator 7 (horizontal direction in FIG. 2). Therefore, the space 37 is spatially wider than the space 36.

The excitation wire 4 and the output wires 5 and 6 are wound around the tooth members 2 from the outside of the end insulator 3 at predetermined positions. The positions of the excitation wire 4 and the output wires 5 and 6 are set arbitrarily. In this embodiment, the excitation wire 4 is wound around the twelve tooth members 2 positively or negatively by a predetermined number of turnings (number of windings) in a concentrated fashion. The polarity of the excitation wire 4 positively wound around the tooth members 2 is different from the polarity of the excitation wire 4 negatively wound around the tooth members 2.

A phase of the output wire 5 and a phase of the output wire 6 are different from each other by 90 degrees. A SIN output voltage is outputted from the output wire 5, while a COS output voltage is outputted from the output wire 6 responsive to an input voltage from the excitation wire 4. The output wire 5 is wound around the six tooth members 2 shown in FIG. 1 by a predetermined number of turnings in a concentrated fashion so that a polarity is alternated. The output wire 6 is wound around the six tooth members 2 shown in FIG. 1 by a predetermined number of turnings in a concentrated fashion so that a polarity is alternated.

As described in the foregoing, the excitation wire 4 and either one of the output wires 5 and 6 are wound around each of the tooth members 2. As shown in FIG. 2, the excitation wire 4 is wound around from the outside of the end insulator 3 in such a fashion that the excitation wire 4 is housed in the space 36. Either one of the output wires 5 and 6 is wound around from the outside of the end insulator 3 in such a fashion that the output wire 5 or 6 is housed in the space 37. Note that the output wire 6 is wound around in the space 37 in FIG. 2. Since the spaces 36 and 37 are in the electrically insulated state due to the partition 35, the excitation wire 4 is reliably insulated from the output wires 5 and 6.

The winding method of the excitation wire 4 and the output wires 5 and 6 is not particularly limited. However, it is possible to efficiently wind the excitation wire 4 and the output wires 5 and 6 around the tooth members 2 in the concentrated fashion by continuously winding a copper wire around the tooth members 2 by using a flyer type or nozzle type winding machine and fixing crossovers each between the adjacent tooth members 2 by latching the crossovers to the end insulator 3. As shown in FIG. 2, an excitation wire retaining part 38, an output wire retaining part 39, and an output wire retaining part 40 are formed between the adjacent tooth members 2 on the outer periphery of the end insulator 3. The excitation wire retaining part 38 retains the crossover of the excitation wire 4. The output wire retaining part 39 retains the crossover of the output wire 5. The output wire retaining part 40 retains the crossover of the output wire 6.

Figure 3:
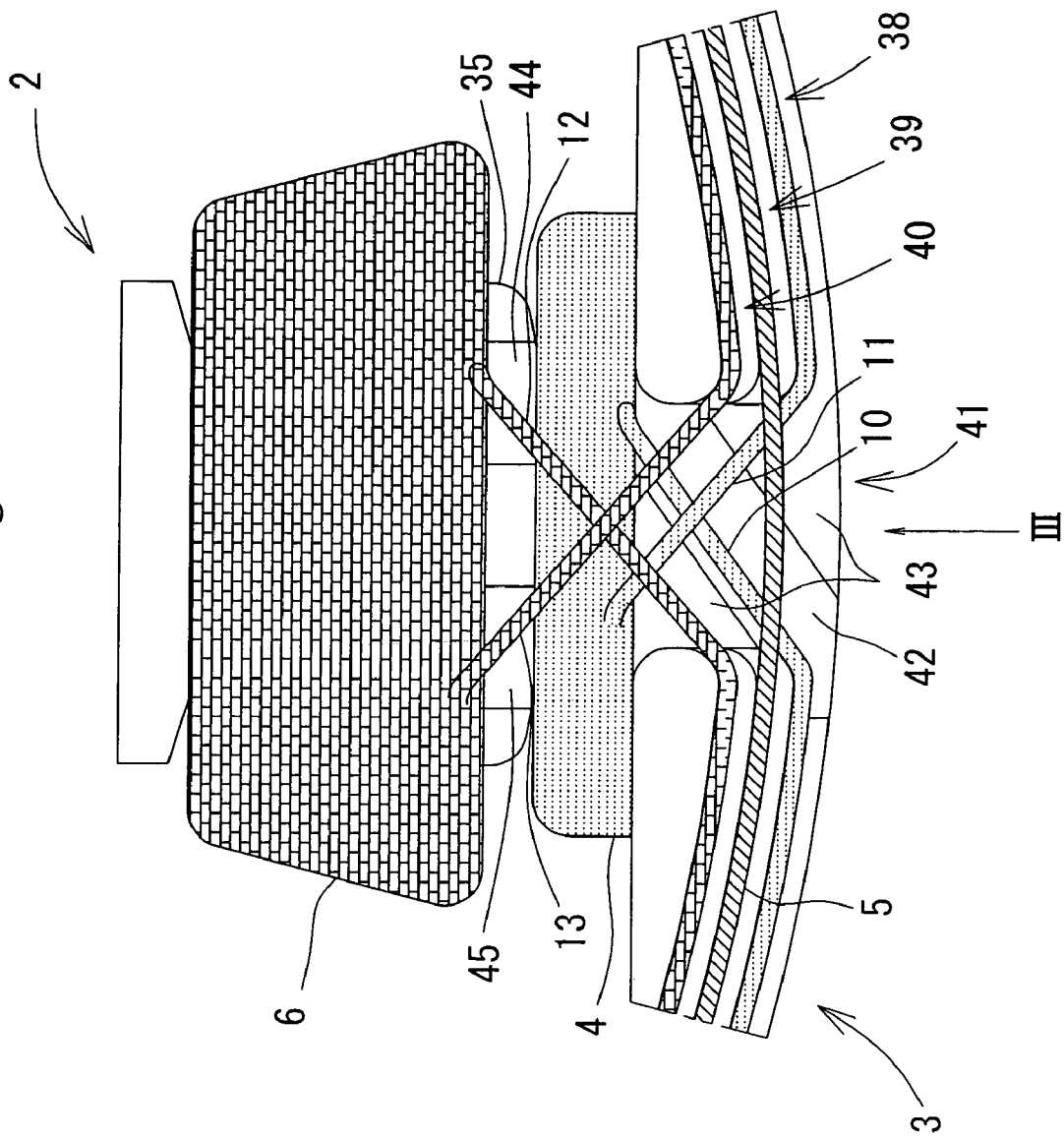
FIG. 3 is a partially enlarged view of FIG. 1.

As shown in FIGS. 2 and 3, the excitation wire retaining part 38, the output wire retaining part 39, and the output wire retaining part 40 have a stair-like shape wherein the excitation wire retaining part 38 is positioned at the bottom. Each of the excitation wire retaining part 38, the output wire retaining part 39, and the output wire retaining part 40 has the shape of one step of stairs, which is formed of a horizontal surface and a vertical surface. In other words, a corner formed by the horizontal surface and the vertical surface is the excitation wire retaining part 38, the output wire retaining part 39, or the output wire retaining part 40. A width of the horizontal surface and a height of the vertical surface are larger than a diameter of the excitation wire 4 and the output wires 5 and 6. The excitation wire 4 and the output wires 5 and 6 are latched and positioned at the corners of the stair-like shape. Thus, the crossover of the excitation wire 4, the crossover of the output wire 5, and the crossover of the output wire 6 are positioned without being brought into contact with one another and electrically insulated from one another without fail. Further, an appropriate tension is applied on the crossovers during winding work. Also, reliability of vibration resistance of the variable reluctance type angle detector 1 is enhanced. Note that the crossovers of the excitation wire 4 and the output wires 5 and 6 are omitted in FIG. 1.

FIG. 3 is a partially enlarged view of one of the tooth members 2. The excitation wire 4 and the output wire 6 are wound around this tooth member 2. The excitation wire 4 and the output wire 6 are drawn into the tooth member 2 from the excitation wire retaining part 38 and the output wire retaining part 40 on the outer periphery of the end insulator 3 through a feed port 41. Therefore, a winding start portion 10 and a winding end portion 11 of the excitation wire 4 are wired over a substantially radial direction of the stator 7. Likewise, a winding start portion 12 and a winding end portion 13 of the output wire 6 are wired over the substantially radial direction of the stator 7. As used herein, the winding start portion and the winding end portion mean the portions wired from the crossovers to the coil over the radial direction of the stator.

As described in the foregoing, the excitation wire 4 and the output wire 5 or 6 are wound around each of the tooth members 2 by the predetermined number of turnings, and the number of turnings of the excitation wire 4 is smaller than that of the output wire 5 or 6. Therefore, the excitation wire 4 is wound in the space 36 which is smaller than the space 37 and partitioned from the space 37 by the partition 35. Either one of the output wires 5 and 6 is wound around in the wider space 37. Since the partition 35 is disposed in the radially outward part, it is possible to reduce a length of each of the winding start portion 12 and the winding end portion 13 of the output wire 6 wound around in the space 37 which is positioned in the radially inward part. Thus, the reliability of resistance to vibration of the variable reluctance type angle detector 1 is enhanced.

As shown in FIG. 3, the feed port 41 is formed at positions corresponding to each of the tooth members 2 on the outer periphery of the end insulator 3. Each of the feed port 41 is used for inserting the excitation wire 4 and the output wire 5 or 6 wound around the relevant tooth member 2. A part of the outer support 33 is cut in the axial direction of the stator 7 to form the feed port 41. A first guiding unit 42 and a second guiding unit 43 are formed at the feed port 41. The first guiding unit 42 guides the winding start portion 10 of the excitation wire 4. The second guiding unit 43 guides the winding end portion 11 of the excitation wire 4.

Figure 4:
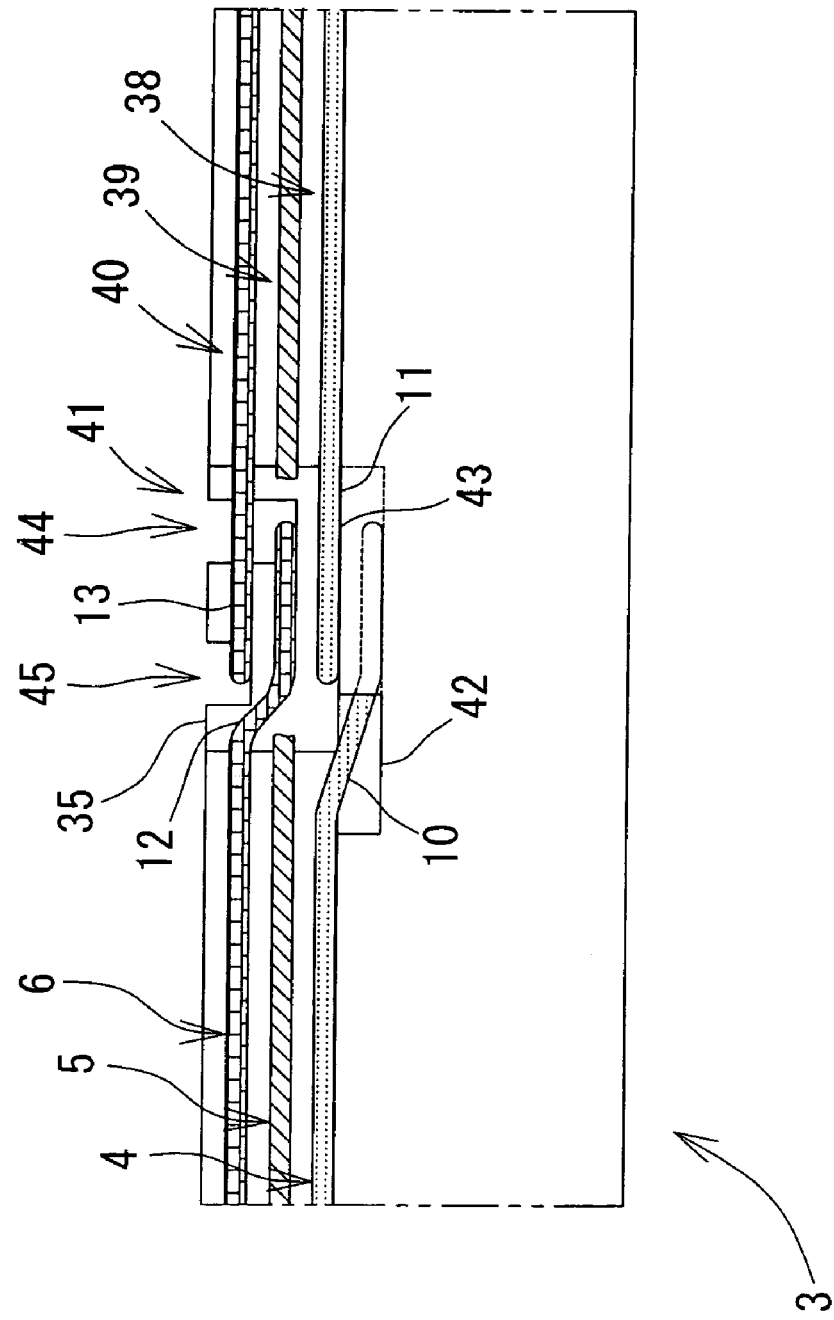
FIG. 4 is an enlarged side view as viewed from an arrow III of FIG. 3.
Figure 5:
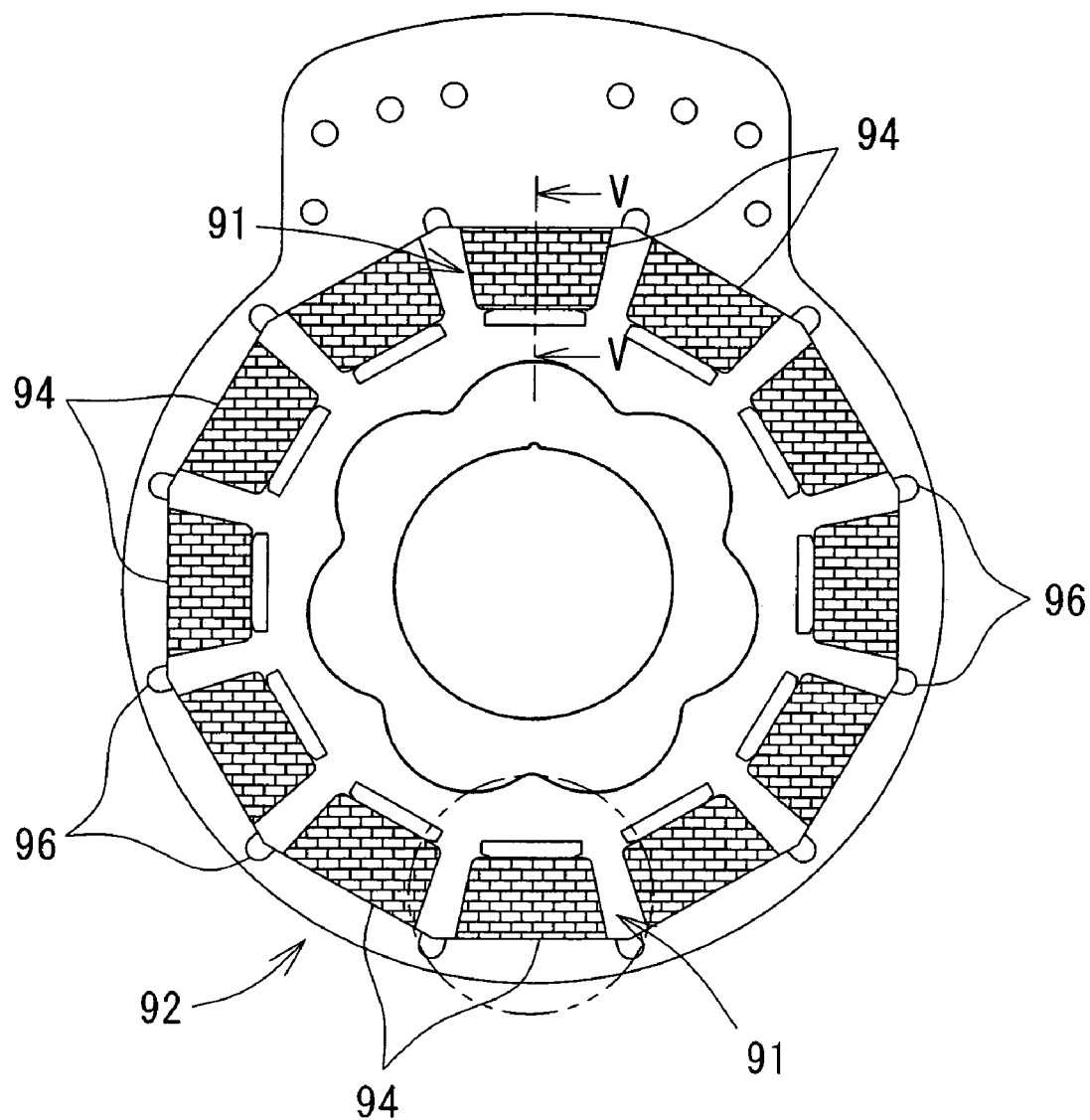
FIG. 5 is a plan view showing a main structure of a conventional variable reluctance type angle detector.
Figure 6:
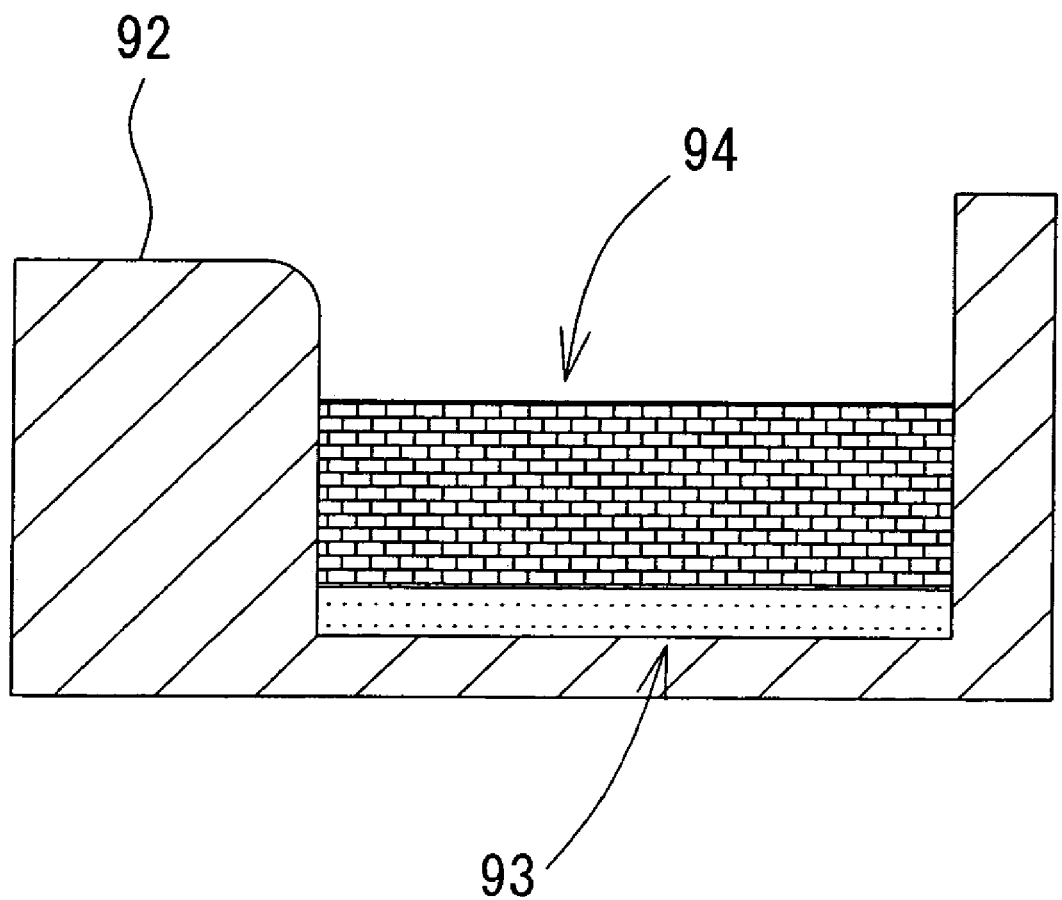
FIG. 6 is a sectional view showing the V-V section of FIG. 5.
Figure 7:
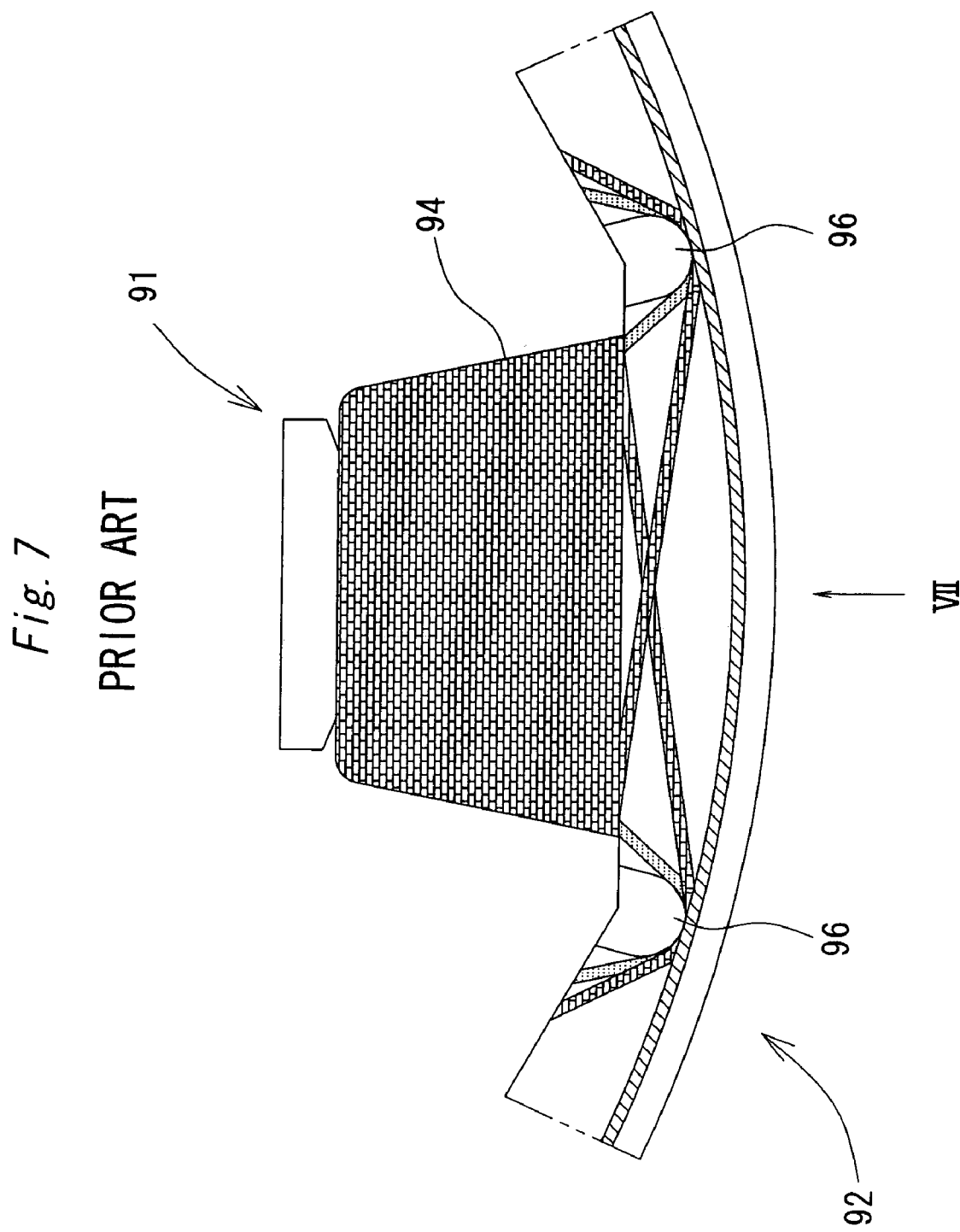
FIG. 7 is a partially enlarged view of FIG. 5.
Figure 8:
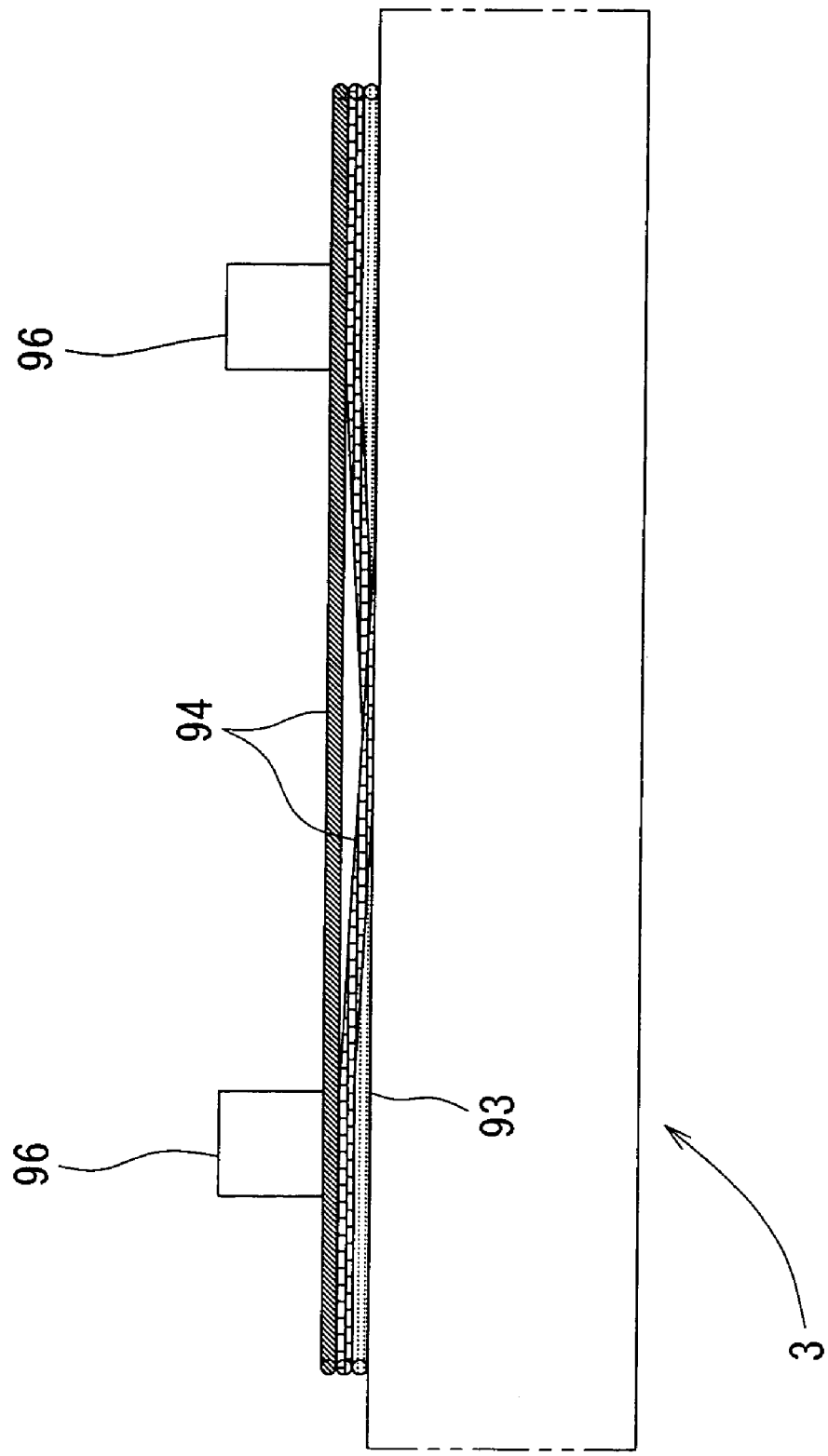
FIG. 8 is an enlarged side view as viewed from an arrow VII of FIG. 7.

FIG. 4 is an enlarged side view as viewed from the arrow III of FIG. 3. In FIG. 4, a part of the output wire 5 is omitted for convenience of description. As shown in FIGS. 3 and 4, the first guiding unit 42 is a groove. The groove is lower than a position at which the excitation wire retaining part 38 supports the excitation wire 4. Also, the groove is so formed as to orient the feed port 41 diagonal to the radial direction of the stator 7. A depth of the groove is well larger than the diameter of the excitation wire 4. The second guiding unit 43 is banks formed on both sides of the groove serving as the first guiding unit 42. A height of each of the banks is such that an upper surface thereof reaches to the position at which the excitation wire retaining part 38 supports the excitation wire 4. Therefore, the first guiding unit 42 and the second guiding unit 43 has a difference in level for the depth of the groove, and this difference in level keeps the winding start portion 10 and the winding end portion 11 of the excitation wire 4 out of contact with each other.

As shown in FIGS. 3 and 4, the winding start portion 10 of the excitation wire 4 is fitted into the first guiding unit (groove) 42 to be guided to the tooth member 2 through the feed port 41. The winding end portion 11 of the excitation wire 4 is supported by the second guiding unit 43 (banks) to be guided to the excitation wire retaining part 38 through the feed port 41. Thus, the winding start portion 10 and the winding end portion 11 are guided without being brought into contact with each other in the case where the winding start portion 10 and the winding end portion 11 intersect with each other. Thus, the winding start portion 10 and the winding end portion 11 of the excitation wire 4 are electrically insulated from each other without fail.

Since the first guiding unit 42 is the groove, it is positioned lower than the second guiding unit 43. That is, the first guiding unit 42 is positioned closer to the tooth member 2 in the axial direction of the stator 7 as compared to the second guiding unit 43. Therefore, the winding start portion 10 of the excitation wire 4 guided by the first guiding unit 42 is positioned closer to the tooth member 2 as compared to the winding end portion 11. In the case where the excitation wire 4 is wound around the tooth member 2, the winding starts from the winding start portion 10, and the winding end portion 11 is ultimately drawn out to the outer periphery of the stator 7. That is, the winding end portion 11 is positioned more distant from the tooth member 2 in the axial direction of the stator 7 as compared to the winding start portion 10. Therefore, the first guiding unit 42 may preferably be positioned closer to the tooth member 2 in the axial direction of the stator 7 as compared to the second guiding unit 43.

Depending on the direction (positive or negative) of the winding of the excitation wire 4 on the tooth member 2, the winding start potion 10 and the winding end portion 11 do not intersect with each other. In such case, the first guiding unit 42 and the second guiding unit 43 are not used. That is, by guiding the winding start portion 10 and the winding end portion 11 to the tooth member 2 along both sides of the feed port 41, the winding start portion 10 and the winding end portion 11 are guided without being brought into contact with each other.

As shown in FIGS. 3 and 4, a third guiding unit 44 and a fourth guiding unit 45 are formed on the partition 35. The third guiding unit 44 guides the winding start portion 12 of the output wire 6. The fourth guiding unit 45 guides the winding end portion 13 of the output wire 6. As shown in FIG. 4, the third guiding unit 44 is a slit cut from an upper end of the partition 35 in the axial direction of the stator 7 and having a width larger than the diameter of the output wire 6. The bottom of a depth of the slit is lower than a position at which the output wire retaining part 40 supports the output wire 6. The fourth guiding unit 45 is a slit cut from the upper end of the partition 35 in the axial direction of the stator 7 and having a width larger than the diameter of the output wire 6. The fourth guiding unit 45 is formed at a position different from that of the third guiding unit 44. The bottom of a depth of the slit of the fourth guiding unit 45 is at a level same as that of the position at which the output wire retaining part 40 supports the output wire 6. A difference in level of the depths of the slits is formed by the third guiding unit 44 and the fourth guiding unit 44, so that the winding start portion 12 and the winding end portion 13 of the output wire 6 are not brought into contact with each other.

As shown in FIGS. 3 and 4, the winding start portion 12 of the output wire 6 is fitted into the third guiding unit 44 to be guided from the feed port 41 to the radially inward part of the partition 35. The winding end portion 13 of the output wire 6 is fitted into the fourth guiding unit 45 to be guided to the radially outward part of the partition 35, i.e. to the output wire retaining part 40. Thus, the winding start portion 12 and the winding end portion 13 are guided without being brought into contact with each other by the third guiding unit 44 and the fourth guiding unit 45 in the case where the winding start portion 12 and the winding end portion 13 intersect with each other as shown in FIG. 3. Thus, the winding start portion 12 of the output wire 6 and the winding end portion 13 of the output wire 6 are electrically insulated from each other without fail.

By using the slit deeper than that of the fourth guiding unit 45 as the third guiding unit 44, the third guiding unit 44 is positioned closer to the tooth member 2 in the axial direction of the stator 7 as compared to the fourth guiding unit 44. Therefore, the winding start portion 12 of the output wire 6 guided by the third guiding unit 44 is positioned closer to the tooth member 2 as compared to the winding end portion 13. In the case where the output wire 6 is wound around the tooth member 2, the winding starts from the winding start portion 12, and the winding end portion 13 is ultimately drawn out to the outer periphery of the stator 7. That is, the winding end portion 13 is more distant in the axial direction of the stator 7 as compared to the winding start portion 12. Therefore, the third guiding unit 44 may preferably be positioned closer to the tooth member 2 in the axial direction of the stator 7 as compared to the fourth guiding unit 45.

Depending on the direction (positive or negative) of the winding of the output wire 6 on the tooth member 2, the winding start potion 12 and the winding end portion 13 do not intersect with each other. In such case, the independent two slits like the third guiding unit 44 and the fourth guiding unit 45 are not provided on the partition 35, and one wider slit may be formed on the partition 35. By guiding the winding start portion 12 and the winding end portion 13 to the inward part of the partition 35 along both sides of the slit, the winding start portion 12 and the winding end portion 13 are guided without being brought into contact with each other.

Though the tooth member 2 on which the excitation wire 4 and the output wire 6 are wound is shown in FIGS. 2 and 3, the same applies to the tooth members 2 on which the excitation wire 4 and the output wire 5 are wound. Though the structure wherein: the number of the turnings of the excitation wire 4 is smaller than the number of turnings of the output wires 5 and 6; and the excitation wire 4 is wound on the radially outward part of each of the tooth members 2 is described in this embodiment, the output wires 5 and 6 may be wound on the radially outward part of the tooth members 2 in the case where the number of turnings is smaller than the number of turnings of the excitation wire 4.

As described in the foregoing, the partition 35 is provided on the end insulator 3 provided on the tooth members 2 of the stator 7 in the variable reluctance type angle detector 1, so that the space 36 in which the excitation wire 4 is wound is insulated and separated from the space 37 in which the output wire 5 or 6 is wound. Thus, the excitation wire 4 and the output wire 5 or 6 are reliably insulated from each other in each of the tooth members 2.

Also, since the excitation wire retaining part 38 and the output wire retaining parts 39 and 40 having the stair-like shape are formed on the end insulator 3, the crossovers of the excitation wire 4 do not contact the crossovers of the output wires 5 and 6. Thus, the excitation wire 4 is reliably insulated from the output wire 5 or 6 in each of the tooth members 2.

Also, since the first guiding unit 42 and the second guiding unit 43 are formed on the feed port 41 of the end insulator 3 to generate the predetermined difference in level the winding start portion 10 of the excitation wire 4 guided by the first guiding unit 42 does not contact the winding end portion 11 of the excitation wire 4 guided by the second guiding unit 43. Thus, the winding start portion 10 and the winding end portion 11 of the excitation wire 4 are reliably insulated from each other in each of the tooth members 2.

Also, since the third guiding unit 44 and the fourth guiding unit 45 are formed on the partition 35 of the end insulator 3 to generate the predetermined difference in level, the winding start portion 12 of the output wire 5 or 6 guided by the third guiding unit 44 does not contact the winding end portion 13 of the output wire 5 or 6 guided by the fourth guiding unit 45. Thus, the winding start portion 12 and the winding end portion 13 of the output wire 5 or 6 are reliably insulated from each other in each of the tooth members 2. Consequently, the variable reluctance type angle detector 1 enhanced in reliability of insulation is realized.

It is needless to mention that it is possible to make other various modifications in this invention. Therefore, the foregoing embodiments are described for the purpose of illustration and should not be understood in a limited way. Modifications existing in the true spirit and scope of this invention are encompassed by this invention.

What is claimed is:

1. A variable reluctance type angle detector comprising:
a stator having a plurality of tooth members disposed in a circle, each of the tooth members having an excitation wire and an output wire wound thereon;
a rotor which rotates with respect to the stator and has such a shape that a gap permeance varies in a sine wave fashion with respect to an angle θ;
an end insulator provided on the stator for insulating and covering the tooth members;
the end insulator has a partition that insulates and separates the excitation wire from the output wire wound around each of the tooth members in a radial direction of the stator; and
an excitation wire retaining part retaining a crossover of the excitation wire and an output wire retaining part retaining a crossover of the output wire are formed at a position corresponding to each of the tooth members on the end insulator in a stair-like shape so that the crossover of the excitation wire does not contact the crossover of the output wire.

2. The variable reluctance type angle detector according to claim 1, wherein the partition is disposed at a position outward from a center in the radial direction of the stator of each of the tooth members.

3. The variable reluctance type angle detector according to claim 1, wherein the output wire is wound around each of the tooth members at a predetermined position, and the output wire retaining part has a stair-like shape having steps corresponding to a number of output wires so that the crossover of one of the output wires does not contact the crossover of the other one of the output wires.

4. The variable reluctance type angle detector according to claim 3, wherein
the end insulator has a feed port positioned corresponding to each of the tooth members and used for inserting the excitation wire or the output wire to be wound at a position of the stator radially outward from the partition, and
a first guiding unit guiding a winding start portion of the excitation wire or the output wire and a second guiding unit guiding a winding end portion of the excitation wire or the output wire are formed in such a fashion that a predetermined difference in level is defined therebetween to keep the winding start portion and the winding end portion out of contact with each other.

5. The variable reluctance type angle detector according to claim 4, wherein the predetermined difference in level is so formed as to position the first guiding unit closer to the tooth member in an axial direction of the stator as compared to the second guiding unit.

6. The variable reluctance type angle detector according to claim 3, wherein a third guiding unit guiding the winding start portion of the excitation wire or the output wire wound at a position of the stator radially inward from the partition provided for each of the tooth members on the end insulator and a fourth guiding unit guiding a winding end portion of the excitation wire or the output wire are formed in such a fashion that a predetermined difference in level is defined therebetween to keep the winding start portion and the winding end portion out of contact with each other.

7. The variable reluctance type angle detector according to claim 6, wherein the predetermined difference in level is so formed as to position the third guiding unit closer to the tooth member in an axial direction of the stator as compared to the fourth guiding unit.

* * * * *